Figure 2:
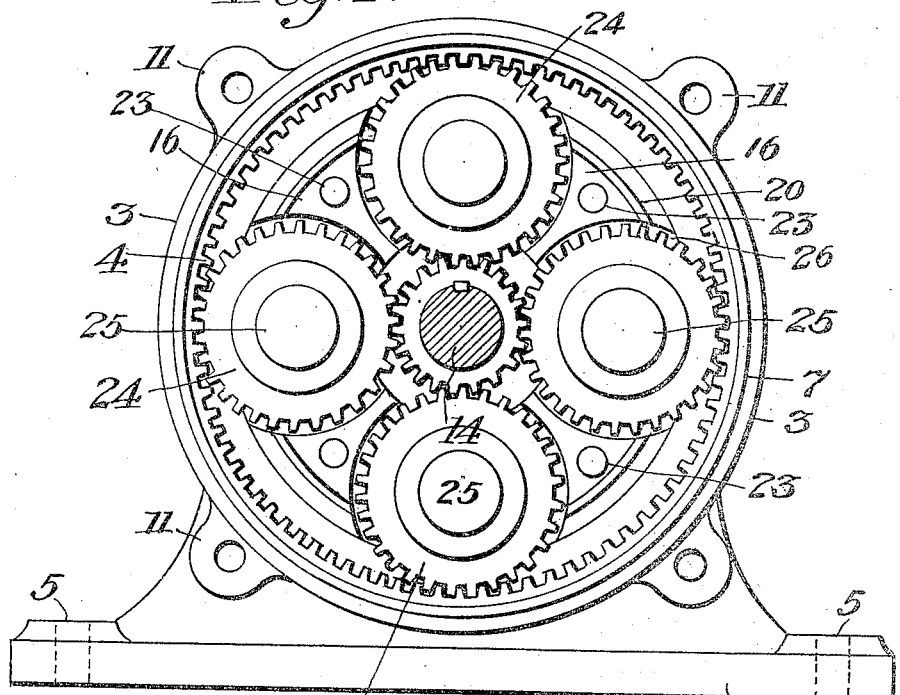

J. NEILL.
SPEED REDUCING GEARING.
APPLICATION FILED APR. 20, 1914.

1,138,968.

Patented May 11, 1915.

UNITED STATES PATENT OFFICE.

JOHN NEILL, OF HONOLULU, TERRITORY OF HAWAII.

SPEED-REDUCING GEARING.

1,138,968.

Specification of Letters Patent.

Patented May 11, 1915.

Application filed April 20, 1914. Serial No. 833,123.

*To all whom it may concern:*

Be it known that I, JOHN NEILL, a citizen of the United States, residing at Honolulu, county of Honolulu, Territory of Hawaii, have invented certain new and useful Improvements in Speed-Reducing Gearing; and I do hereby declare the following to be a full, clear, and exact description of the invention, such as will enable others skilled in the art to which it appertains to make and use the same.

This invention relates to speed reducing gearing for operatively connecting two shafts such that the speed of one of the shafts will be reduced, and particularly to gearing of this character adapted to be applied in a direct line between and to connect the shaft of the higher speed motor and the shaft of the slower speed machinery to be driven thereby.

Motors, such as gasolene, electric, or steam turbines, which have lately come into favor, have their greatest efficiency when running at a relatively high rate of speed. It is seldom, however, that the machinery to be driven can be directly connected to such a motor on account of this difference between the speed of the machinery to be driven and that of the motor, and consequently various devices have been employed to meet this condition.

The present invention contemplates gearing, which can be easily introduced between the higher speed motor and the slower speed machinery to be driven, to connect their shafts arranged in a direct line with one another, and give any desired reduction in the speed. Such gearing is particularly applicable, for example, for connecting the propeller shaft of a vessel with the shaft of a high speed motor, such as a steam turbine.

The invention comprises a stationary housing provided with an internal spur gear, a pinion secured to the higher speed shaft, one or more intermediate gears adapted to mesh with both the internal gear and the pinion and to revolve journaled in a member which attaches to the slower speed shaft and which revolves in said housing, as will hereinafter more fully appear. The pitch, the face, and the number of teeth of the pinion, the internal gear and the intermediate gears, depend upon the power to be transmitted and the reduction in speed desired. A reduction in speed of from five to one up to twenty to one may easily be attained by the device contemplated. When the space to receive the housing is limited, however, two or more of these sets of gearing may be placed in tandem, and any desired reduction in speed may thus be had. Of course, ball or roller bearings and other refinements may, if desired, be employed to reduce the friction.

This specification is a specific description of one form of the invention while the claims are definitions of its actual scope.

The invention consists in the construction, arrangement and combination of parts hereinafter described and claimed, reference being had to the accompanying drawings, forming a part of this specification, in which—

Figure 1:
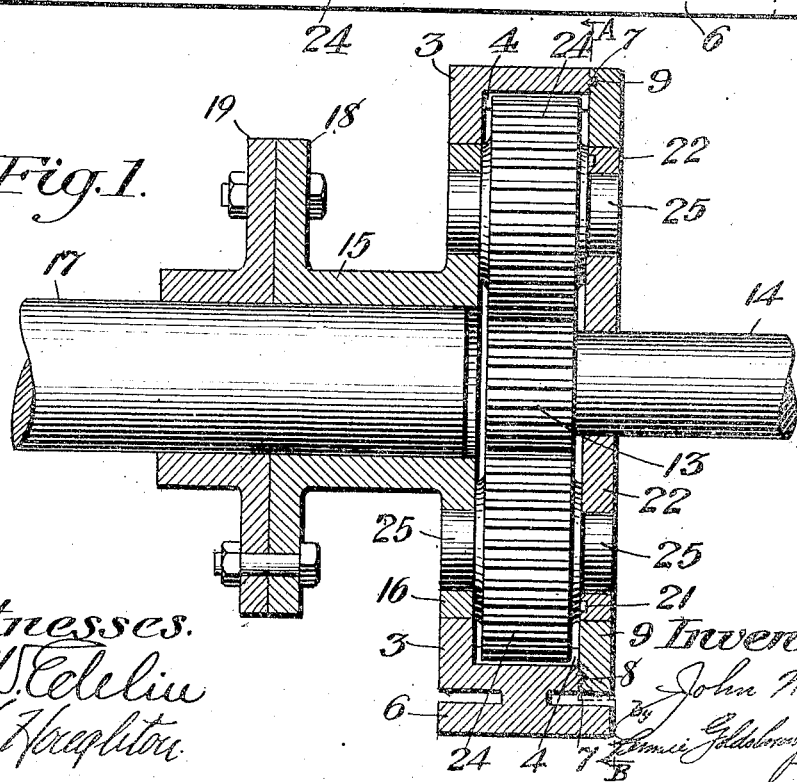

Figure 1 is a longitudinal sectional elevation of the improved gearing and its housing. Fig. 2 is a view on the line A—B of Fig. 1.

Referring to the drawings, the housing 3 is provided with the internal spur gear 4, which may either be bolted thereto or be integral thereof as shown. The housing 3 is stationary and may be secured in its proper position by bolts through the holes 5 in the base 6. The annular tongue 7 on the housing 3 is adapted to fit in the corresponding groove 8 in the ring 9. The ring 9 is bolted to the housing 3 by the bolts 10 through the lugs 11 and 12 on the housing 3 and the ring 9 respectively. The spur pinion 13 is keyed on the end of the higher speed shaft 14. The hub 15 of the casting 16 is bored to fit and be keyed on the end of the slower speed shaft 17. If preferred, the flange 18 of the casting 16 may be bolted to a flange 19 keyed on the end of said shaft 17. The casting 16 is provided with an annular tongue 20 adapted to fit in a corresponding groove 21 in the flat ring shaped cover 22. This cover 22 is bolted to the casting 16 by bolts through the holes 23. The casting 16 and the cover 22 are adapted to revolve together within and be guided by the housing 3 and the ring 9 respectively. The intermediate gears 24, each provided with a shaft or with trunnions 25, are adapted to mesh with the pinion 13 and with the internal gear 4, four of which are shown although more or less may be employed. The casting 16 is provided with suitable recesses 26 to clear the intermediate gears 24. The shafts or trunnions 25 are journaled in the casting 16 and cover 22 respectively. It will now be noted, that when the shaft 14 with the pinion 13 is revolved, the intermediate gears 24 are caused to revolve on their shafts or trunnions 25, and these intermediate gears travel around within the stationary internal gear 4, and consequently cause the casting 16, and the shaft 17 to which it is attached, to revolve at a fixed reduced rate of speed with respect to that of the shaft 14; and that the higher speed shaft 14 and the slower speed shaft 17 are connected in a direct line with one another. In the drawings, the pinion 13 has twenty teeth and the internal gear has eighty teeth, so that the shaft 14 will make five complete revolutions to one revolution of the shaft 17, instead of four revolutions as might at first sight be supposed on account of the ratio of four to one of the internal gear and the pinion. This is due to the fact that the pinion 13 has to revolve the intermediate gears 24 to cause them to travel around the stationary internal gear 4. When an intermediate gear 24 is moved, for example, say ten teeth of the internal gear 4, or one-eighth of a revolution of the shaft 17, the pinion 13 has revolved twelve and a half teeth, or five-eighths of a revolution of the shaft 14, which is five times that of the shaft 17.

I claim:

1. Speed reducing gearing comprising, a stationary housing, a ring bolted to said housing, an internal gear within said housing, a pinion on the higher speed shaft, one or more intermediate gears meshing with said internal gear and said pinion, a casting adapted to be attached to the lower speed shaft, and a cover secured to said casting, each shaft of the intermediate gears journaled in said casting and cover, the casting and cover adapted to turn in the housing and ring, substantially as described.

2. Speed reducing gearing, comprising a stationary housing, disk-like side covers rotatably mounted in the housing and forming therewith an inclosed gear compartment, a shaft entering one side of said housing through one of said side covers, a pinion associated therewith, an internal gear associated with the housing, a pinion interposed between and meshing with said first-named pinion and the internal gear and journaled in both of said side covers, and a second shaft connected to the second rotatable side cover, for the purpose described.

3. Speed reducing gearing, comprising a stationary housing provided with an internal gear, rotatable side covers associated with the housing and forming therewith an inclosed gear compartment, a ring secured to the housing at at least one side thereof in which the corresponding rotatable side cover is mounted, a shaft entering one side of said housing through one of said side covers, a pinion associated therewith, a pinion interposed between and meshing with said first-named pinion and the internal gear and journaled in both of said side covers, and a second shaft connected to the second rotatable side cover, for the purpose described.

In testimony whereof I affix my signature, in presence of two witnesses.

JOHN NEILL.

Witnesses:
 ROBT. J. PRATT,
 P. H. BURNETTE.